US012476423B2

(12) United States Patent
Hsiao et al.

(10) Patent No.: US 12,476,423 B2
(45) Date of Patent: Nov. 18, 2025

(54) ELECTRICAL CONNECTOR WITH AN IMPROVED GROUNDING MEMBER

(71) Applicants: FUDING PRECISION COMPONENTS (SHENZHEN) CO., LTD., Shenzhen (CN); FOXCONN INTERCONNECT TECHNOLOGY LIMITED, Grand Cayman (KY)

(72) Inventors: Shih-Wei Hsiao, New Taipei (TW); Tsu-Yang Wu, New Taipei (TW); Ching-Hsiang Chang, New Taipei (TW)

(73) Assignees: FUDING PRECISION COMPONENTS (SHENZHEN) CO., LTD., Shenzhen (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 365 days.

(21) Appl. No.: 17/989,184

(22) Filed: Nov. 17, 2022

(65) Prior Publication Data

US 2023/0170649 A1 Jun. 1, 2023

(30) Foreign Application Priority Data

Nov. 26, 2021 (CN) .......................... 202111421166.7

(51) Int. Cl.
*H01R 13/6471* (2011.01)
*H01R 12/72* (2011.01)

(52) U.S. Cl.
CPC ....... *H01R 13/6471* (2013.01); *H01R 12/725* (2013.01)

(58) Field of Classification Search
CPC .. H01R 12/712; H01R 12/716; H01R 12/722; H01R 12/724; H01R 12/727; H01R 13/6471; H01R 13/658; H01R 13/6597
USPC .......................... 439/660, 92, 605.34, 607.05
See application file for complete search history.

(56) References Cited

U.S. PATENT DOCUMENTS 8,353,726 B2 * 1/2013 Zhang .................. H01R 13/659 439/637
8,702,451 B2 * 4/2014 Luo ...................... H01R 12/725 439/637
9,455,530 B2 * 9/2016 Patel .................. H01R 13/6597
9,496,657 B1 * 11/2016 Chang ................ H01R 13/6471
9,520,680 B2 12/2016 Hsu et al.
9,640,915 B2 * 5/2017 Phillips .............. H01R 13/6585
9,692,183 B2 * 6/2017 Phillips .............. H01R 13/6471
10,367,308 B2 * 7/2019 Little ................... H01R 4/2404
10,581,206 B2 * 3/2020 Fang .................... H01R 13/646
11,211,750 B2 12/2021 Wu et al.
11,381,039 B2 7/2022 Hsiao et al.
(Continued)

*Primary Examiner* — Marcus E Harcum
(74) *Attorney, Agent, or Firm* — Ming Chieh Chang

(57) ABSTRACT

An electrical connector includes: a longitudinal housing defining a longitudinal direction and a front-rear direction perpendicular to the longitudinal direction; a row of terminals including signal terminals and grounding terminals; and a grounding member retained in the housing and having plural first fingers and plural second fingers, wherein each of the first fingers extends in the longitudinal direction, each of the second fingers extends in the front-rear direction, and each grounding terminal is mechanically and electrically connected with a corresponding first finger and a corresponding second finger.

14 Claims, 12 Drawing Sheets

(56) References Cited

U.S. PATENT DOCUMENTS

| | | | | |
|---|---|---|---|---|
| 11,799,246 | B2 * | 10/2023 | Johnescu | H01R 12/716 |
| 2014/0004744 | A1 * | 1/2014 | Hsu | H01R 13/658<br>439/626 |
| 2016/0006182 | A1 * | 1/2016 | Patel | H01R 13/6597<br>439/108 |
| 2020/0194914 | A1 * | 6/2020 | Hsiao | H01R 13/6473 |
| 2020/0388967 | A1 * | 12/2020 | Hsiao | H01R 13/502 |
| 2021/0098939 | A1 * | 4/2021 | Wu | H01R 13/6595 |
| 2022/0102902 | A1 * | 3/2022 | Lin | H01R 13/6471 |

* cited by examiner

ELECTRICAL CONNECTOR WITH AN IMPROVED GROUNDING MEMBER

BACKGROUND OF THE INVENTION

Field of the Invention

The present invention relates generally to an electrical connector, and particularly to an electrical connector equipped with an improved grounding member with multiple contacting points with grounding terminals.

Description of Related Art

U.S. Pat. No. 11,211,750 discloses an electrical connector with a grounding member having a plurality of first fingers, second finger, and third fingers, wherein each first finger is aligned with one corresponding second finger and one third finger in a front-to-back direction, and corresponding first finger, second finger, and third finger are mechanically and electrically connected with one corresponding grounding contact.

It is desired to improve impedance of an electrical connector.

SUMMARY OF THE INVENTION

An electrical connector equipped with a first grounding member. The connector includes an insulative housing with a mating tongue, and a plurality of stationary first terminal retained in the housing. The first terminals include a plurality of signal terminals and grounding terminals. The grounding member forms a set of first fingers and a set of second fingers respectively located at different positions, to respectively contact the different positions of the respective grounding terminals. The extension direction of the second finger is perpendicular to the extension direction of the first finger.

Other advantages and novel features of the invention will become more apparent from the following detailed description of the present embodiment when taken in conjunction with the accompanying drawings.

DETAILED DESCRIPTION OF THE DRAWINGS

Figure 1:
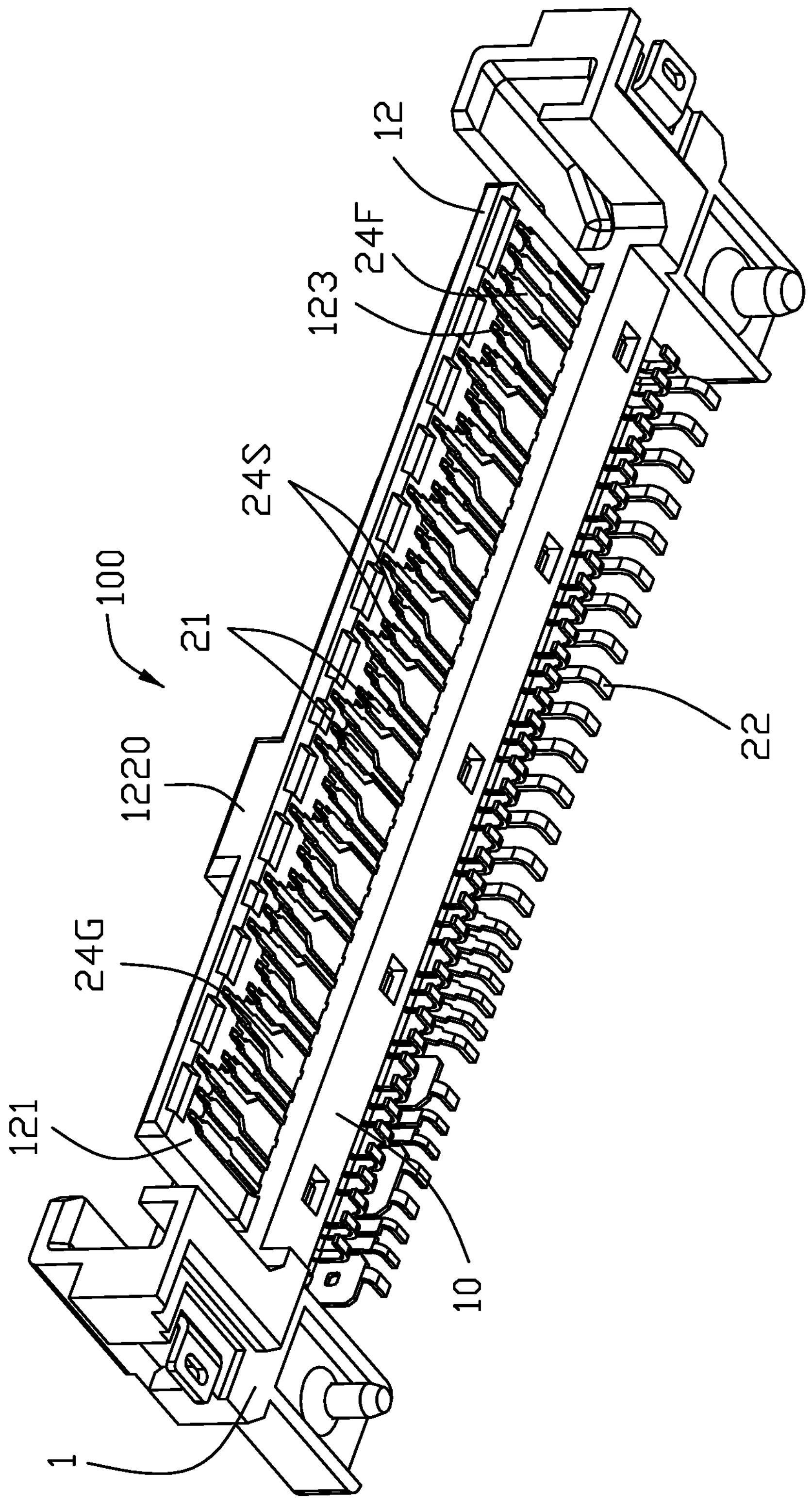
FIG. 1 is a perspective view of an electrical connector.
Figure 2:
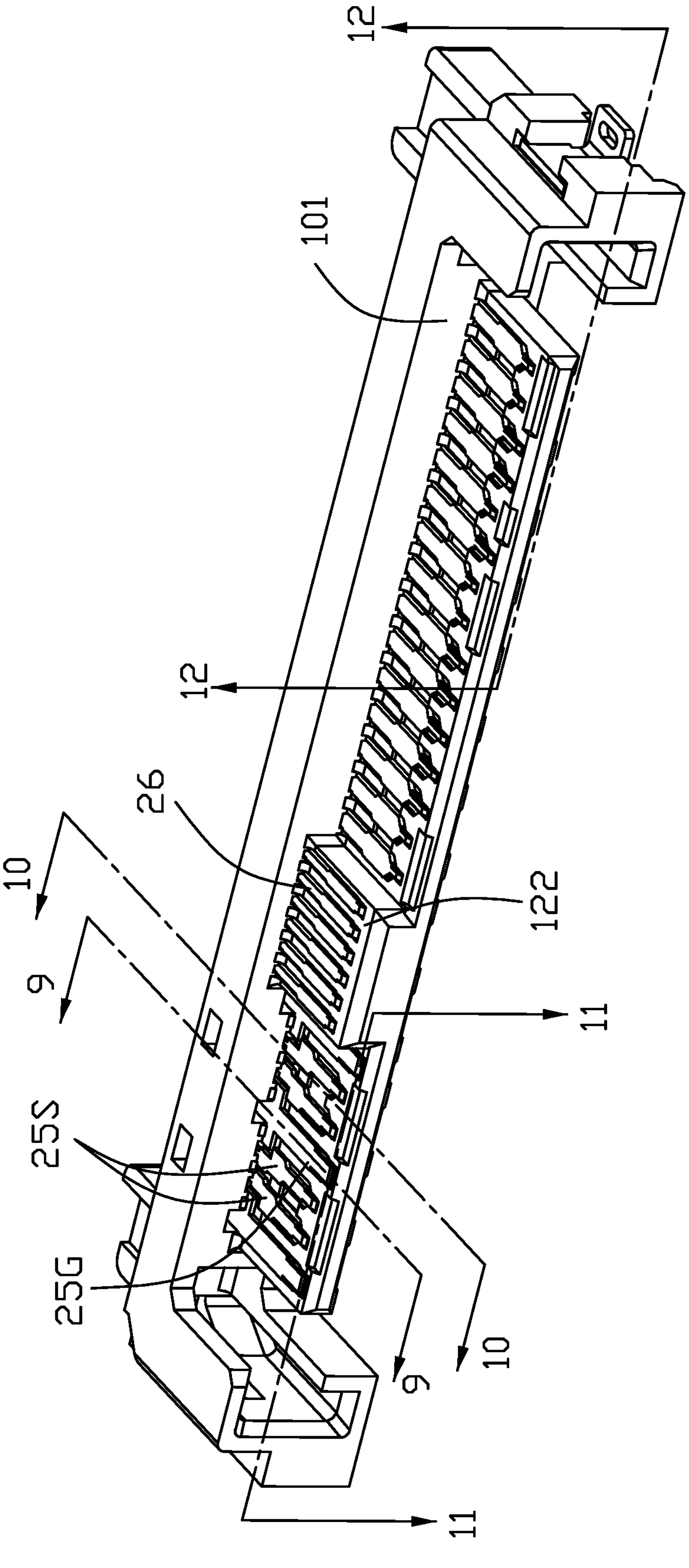
FIG. 2 is another perspective view of the electrical connector of FIG. 1.

Reference will now be made to the drawing figures to describe the preferred embodiment of the present invention in detail.

Figure 10:
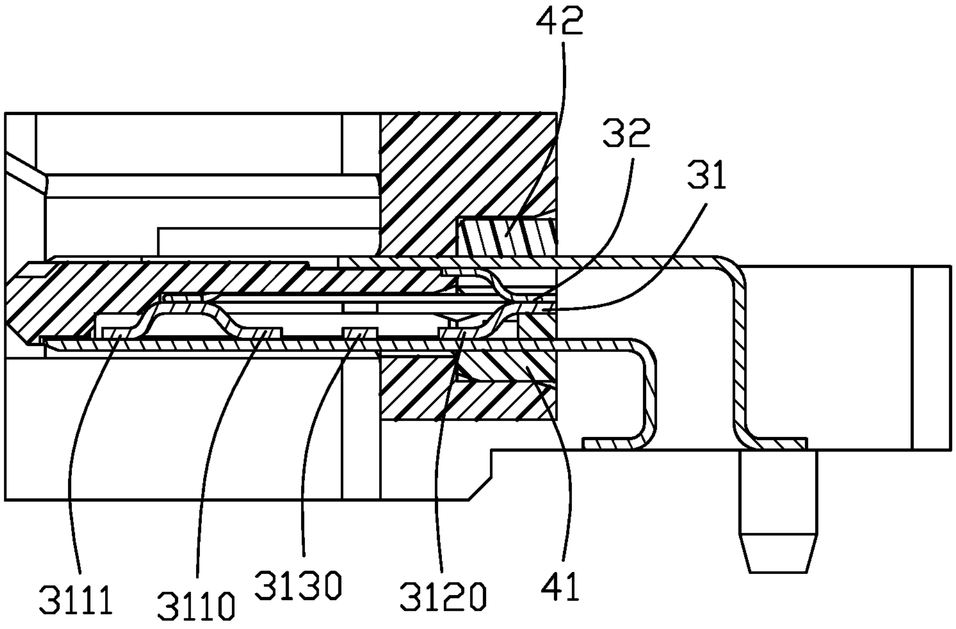
FIG. 10 is a cross-sectional view of the electrical connector of FIG. 2 taken along line 10-10.
Figure 11:
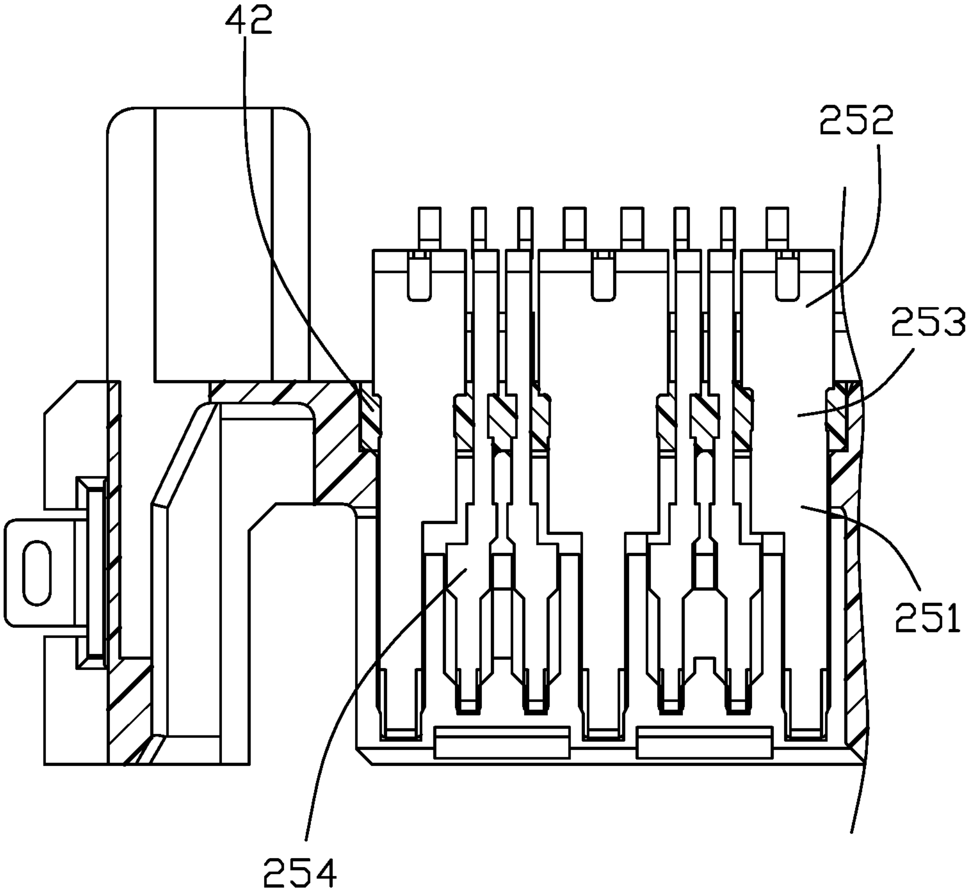
FIG. 11 is a cross-sectional view of the electrical connector of FIG. 2 taken along line 11-11.

Referring to FIGS. 1-4, an electrical connector 100 includes a housing 1, a plurality of terminals 2 retained in the housing 1, and two grounding members 3. The housing 1 includes a base 10 made from insulating material and a tongue 12 forwardly extending from the base 10. The tongue 12 defines a first lower surface 121 and a second upper surface 122 opposite to each other. A plurality of passageways (not labeled) is formed in the first surface 121 and the second surface 122. The contact 2 includes a contacting portion 21 in the passageway and exposed upon the tongue 12, a leg portion 22 extending from the housing 1, a middle portion 23 jointing the contacting portion and the leg portion. Referring to FIG. 10 and FIG. 11, the contact is made from a metal plate, especially the contacting portions 21 and the middle portion 23 exhibit a plate shape located on the tongue 12.

Figure 4:
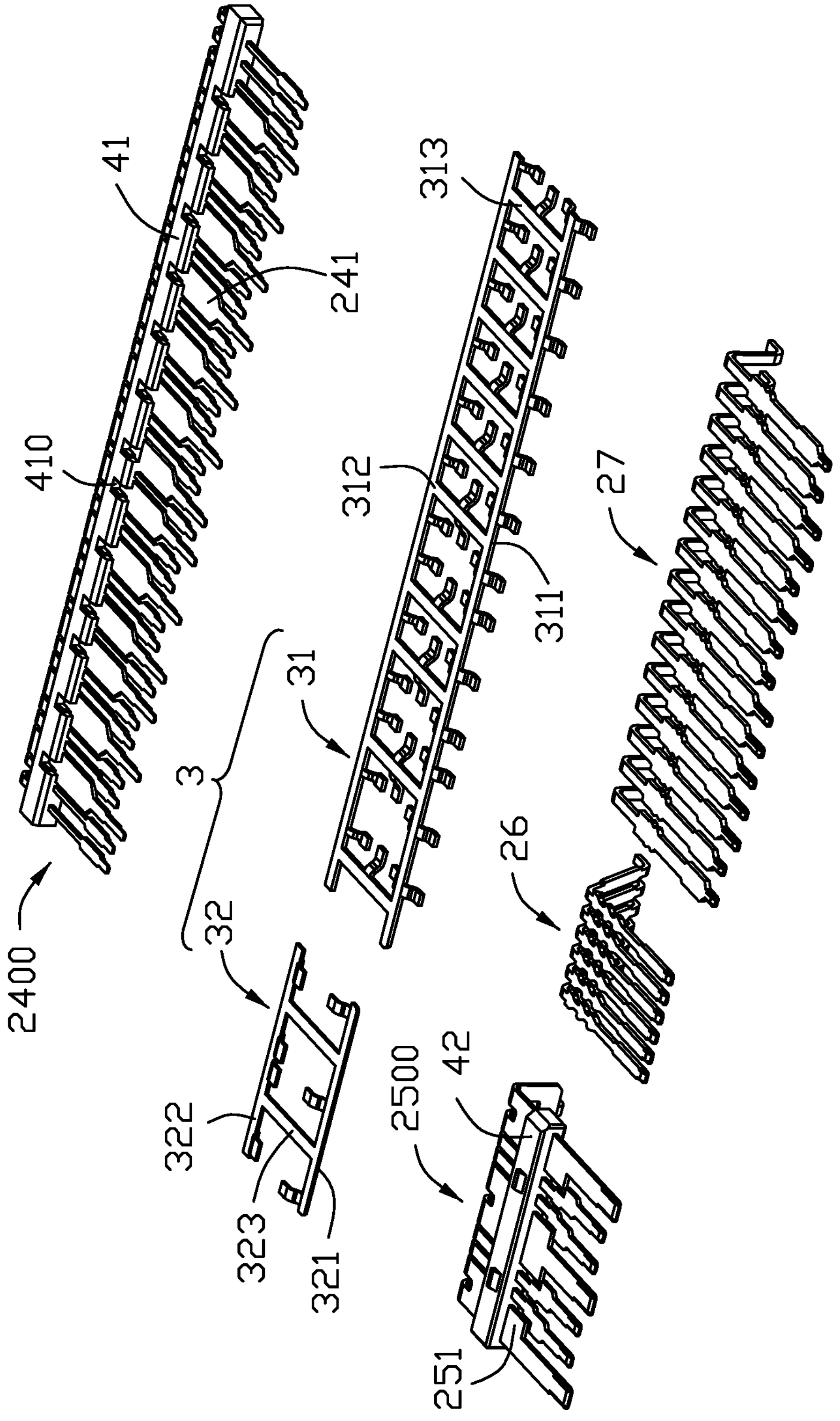
FIG. 4 is an exploded perspective view of contact modules and the grounding members of the electrical connector of FIG. 2.

Referring to FIGS. 1 and 4, the plurality of terminals 2 include a plurality of first terminals 24 and plurality of second terminals 25. The contacting portions 21 of the first terminals are arranged in a row and exposed upon the first surface 121 of the tongue along a longitudinal direction. The contacting portions of the second terminals 25 are exposed upon the second surface 122 of the tongue. The first terminals 24 include a plurality of first signal terminals 24S and a plurality of first grounding terminals 24G. Two adjacent first signal terminals 24S are defined to be a pair of differential signal terminals. The pairs of differential signal terminals and the grounding terminals are alternately arranged with each other. The first grounding terminals 24G is located between two adjacent pairs of first signal terminals is for shielding crosstalk between two pairs of first signal terminals. The first terminals 24 further includes some function terminals 24F for controlling, the function terminals 24F have substantially the same shape as the first signal terminal 24S. The first terminals 24 are insert-molded with a first insulator 41 to be a first contact module 2400, the first contact module is inserted into and received in the base 10 from a rear end of housing 1. The contacting portions 21 extend forward out of the first insulator 41, the leg portions 22 extend backward out of the first insulator 41, and a part of the middle portions 23 are embedded in the first insulator 41.

Normally, contacting portions of terminals are predetermined to engage with a complementary connector, that means, depth along a mating direction and wider along a longitudinal direction and pitch of contacting portions have been a standard, for example, the contacting portions of the electrical connector of this embodiment is defined in SFF-TA-8639. The leg portions 22 usually are predetermined according pads on the PCB. But in actual demand, they can be slightly changed. The middle portions 23 vary according manufacture, impedance and/or other consideration. In this embodiment, the middle portions 23 are changed relative to the contacting portions 21. The middle portion 23 of the first grounding contact 24G includes a horizontal portion 241 and an L-shaped portion 242, and a neck portion 243 jointing the horizontal portion 241 and the L-shaped portion 242. The horizontal portion 241 and the L-shaped portion 242 are wider than the contacting portion 21 along the longitudinal direction. The leg portion 22 bends forward and horizontally from the bottom end of the L-shaped portion 242. The front end 210 extending from the contacting portion 21 is narrower than the contacting portion 21. The tongue 12 defines a slot 123 of on each side of the front end 210 (labeled shown in FIG. 1). The rear end of the L-shaped portion 242 is exposed upon an outside of the base 10.

Figure 7:
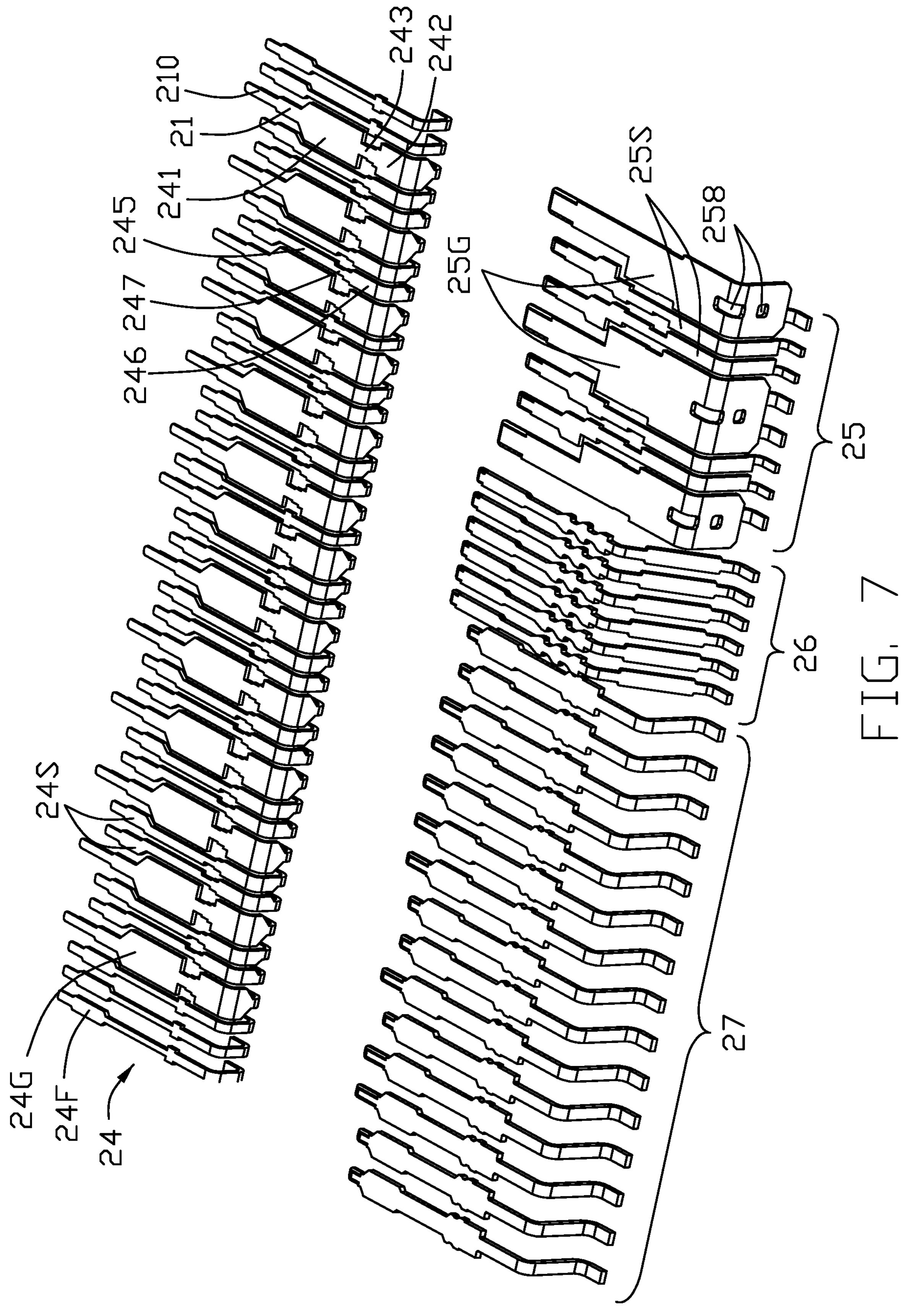
FIG. 7 is an exploded perspective view of the first group of terminals and the second group of terminals.
Figure 8:
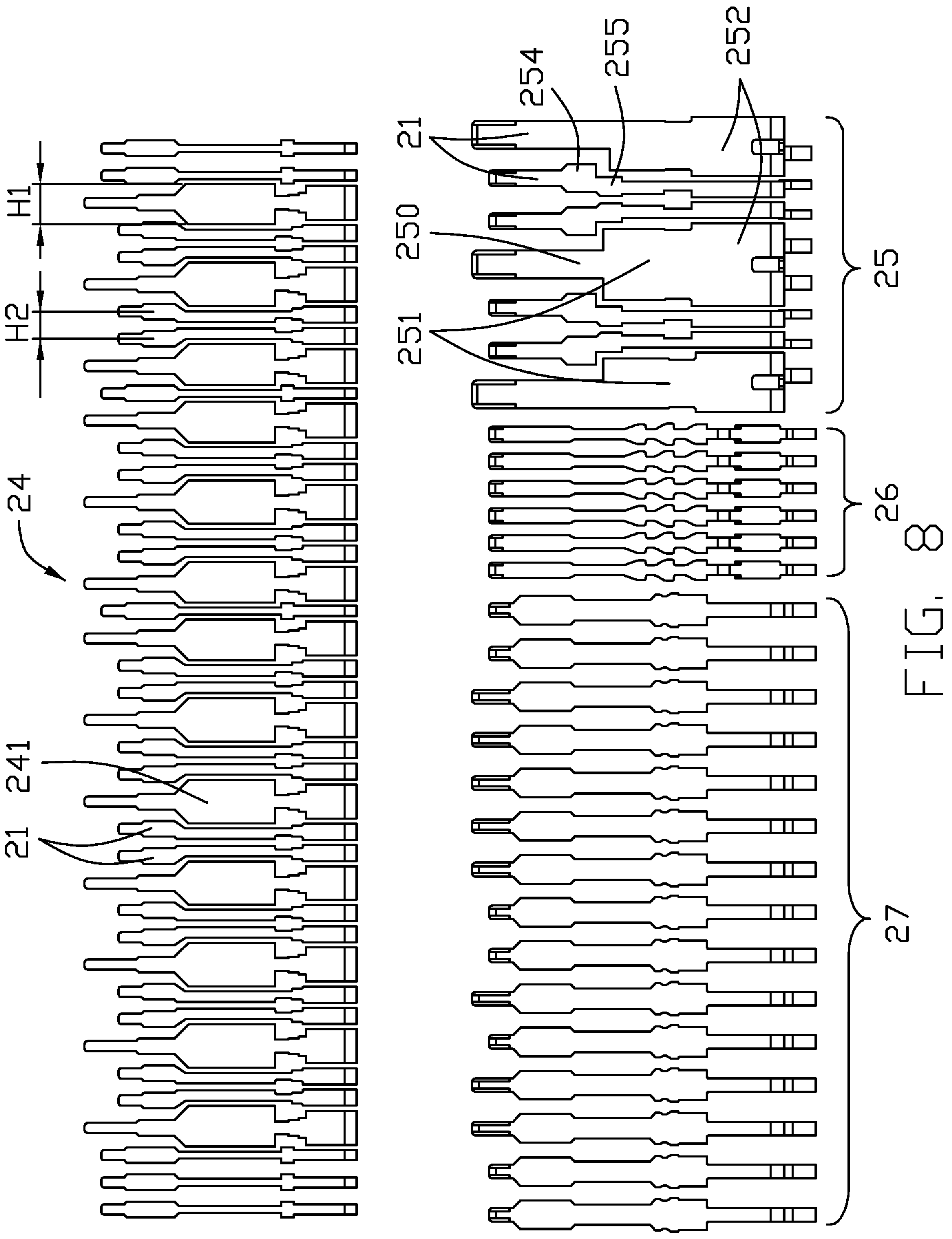
FIG. 8 is a top view of the first group of terminals and the second group of terminals of FIG. 7.

Referring to FIGS. 7-8, the middle portion 23 of the first signal contact 24S include a horizontal portion 245 and an L-shaped portion 246, and a neck portion 247 joint with the horizontal portion 245 and the L-shaped portion 246. As clearly shown, the middle portions 23 of the first grounding terminals 24G are enlarged compared to contacting portions 21 of the first grounding terminals 24G, which the middle portions 23 of the first signal terminals 24S would have occupied. Therefore, the middle portions 23 of the first signal terminals 24S are narrowed. The middle portions 23 of the function terminals 24F are narrowed but keep a same center line with the contacting portions 21 and the leg portions 22, but the middle portions 23 of each pair of first signal terminals 24S between two grounding terminals 24G shift towards each other so as to have a smaller pitch. The horizontal portion 241 of the first grounding contact 24G has a width H1, the pair of differential signal terminals has a distance H2 from one longitudinal side to another longitudinal side, the width H1 is greater than the distance H2.

Figure 12:
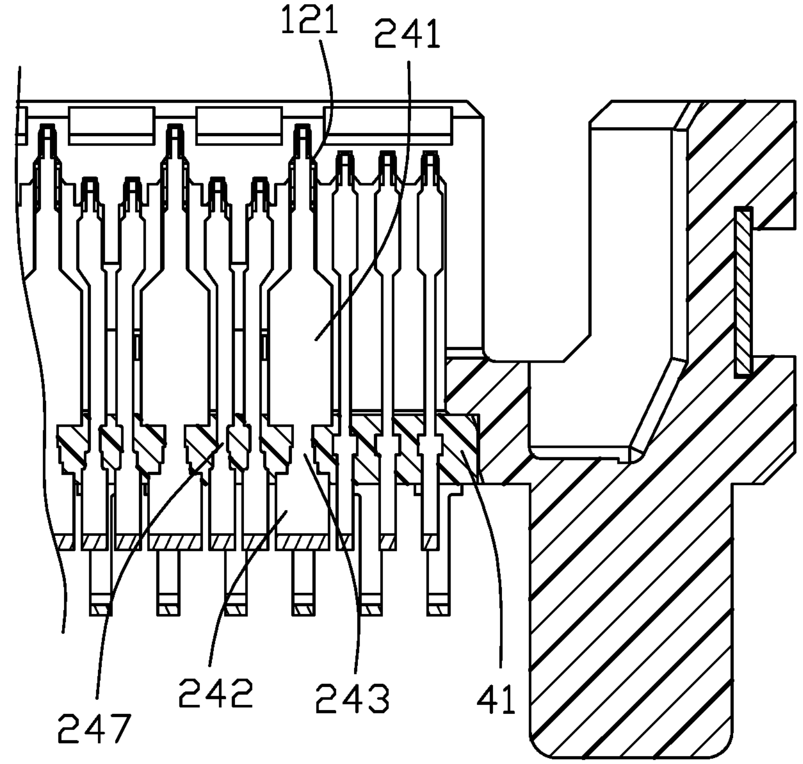
FIG. 12 is a cross-sectional view of the electrical connector of FIG. 2 taken along line 12-12.

Referring to FIG. 12, the neck portions 243, 247, parts of the horizontal portions 241 and the L-shaped portions 242 are molded in the first insulator 41, thereby strengthening a fixing force of the first terminals 24. The neck portions 243 of the first grounding terminals 24G are in three-section pattern, widening from front to back. The middle portion 23 of the grounding terminals 24G and the first signal terminals 24S is symmetrically widened and has a central axis.

Referring to FIGS. 4-6 and 10, the grounding member 3 includes a first grounding member 31 which are mechanically and electrically connected with the first grounding contact 24G and a second grounding member 32 which are mechanically and electrically connected with the second grounding contact 25G. The first grounding member 31 includes a front bar 311, a rear bar 312 and a plurality of bridges 313 extending in the front-rear direction and connecting with the front bar 311 and the rear bar 312. In this embodiment the first grounding member 31 includes a plurality of first fingers 3130, second fingers 3120, third fingers 3110, and fourth fingers 3111, each grounding contact 24G are connected with one first finger 3130, one second finger 3120, one third finger 3110 and one fourth finger 3111. The first fingers 3130 extend in the longitudinal direction, the second finger 3120 extend in the front and rear direction. Similarly, the second grounding member 32 includes a front bar 321, a rear bar 322 and a plurality of bridges 323 and a plurality of fifth fingers 3211, sixth fingers 3221.

Referring again to FIGS. 4-6 and 10, the first fingers 3130 extend from one side of the bridges 313, the second fingers 3120 extend forwardly form the rear bar 312, the third fingers 3110 extend rearward from the front bar 311, and the fourth fingers 3111 extend forward from the front bar 311. The third fingers 3110 and the fourth fingers 3111 extend in opposite directions from opposite edges of the front bar 311. The first fingers 3130 are located between the second fingers 3120 and the third fingers 3110. Each first finger 3130 is partially overlapped with corresponding second finger 3120 and the third finger 3110 and the fourth finger 3111 in the front-back direction. The first finger 3130 terminals a middle point of the horizontal portion 241, the second finger 3120 terminals a rear point of the horizontal portion 241, the third finger 3110 terminals a front point of the horizontal portion 241 and the fourth finger 3111 terminals the neck portion 210. Similarly, the fifth fingers 3211 extends forwardly form the rear strip 322, the sixth fingers 3221 extend from the front strip 321.

Figure 5:
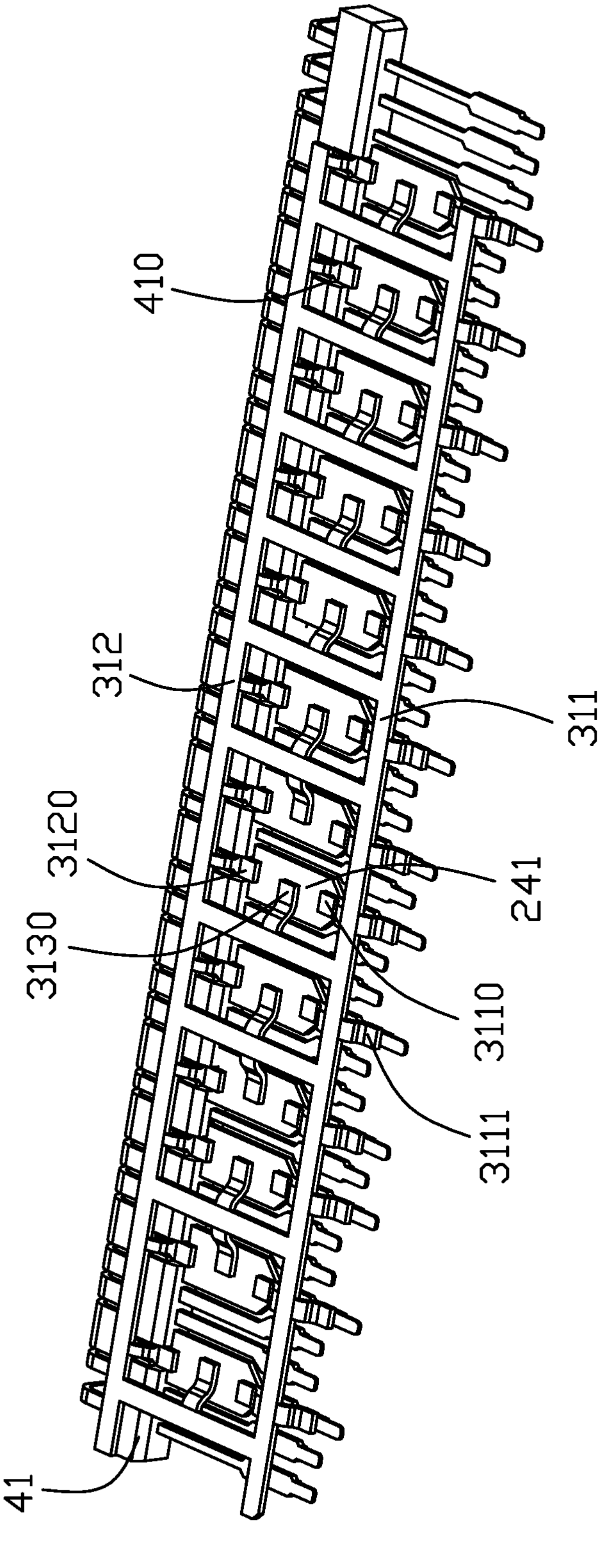
FIG. 5 is a perspective view of a first grounding member and a first contact module of FIG. 4.
Figure 9:
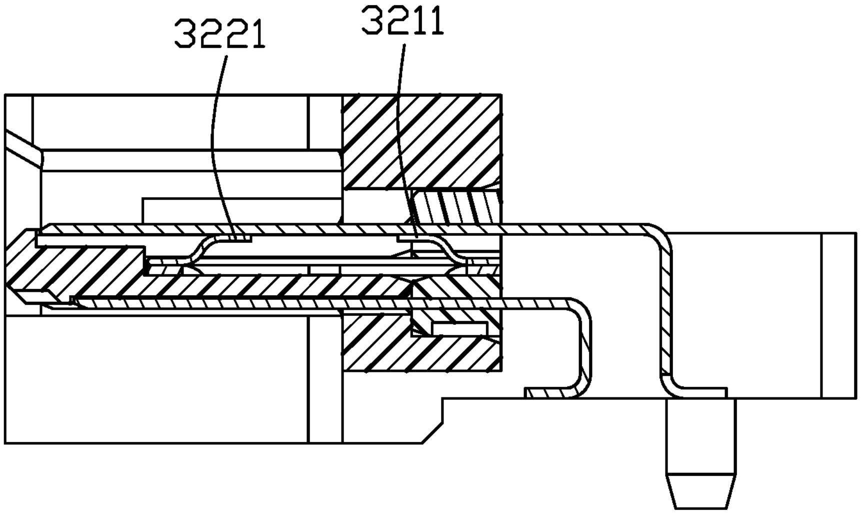
FIG. 9 is a cross-sectional view of the electrical connector of FIG. 2 taken along line 9-9.

Referring to FIGS. 5, 9, and 10, the first grounding member 31 is forwardly assembled into the tongue 12 from the base 10 and the rear bar 312 is located above the first insulator 41, the front bar 311 is located above the contacting portions 21. In detail, the first insulator 41 defines a plurality of slots 410 so as to allow the corresponding second fingers 3120 to extend therethrough for touching the corresponding grounding terminals 24G. The first fingers 3130 are located in the tongue 12 and adjacent to the base 10, the second fingers 3120 are located in the base 10, and the third fingers 3110 and the fourth fingers 3111 are located in the tongue 12.

Referring to FIGS. 7 and 8, the second terminals 25 are divided to three rows, second terminals 25 of a first row at one side of a key 1220, second terminals 26 of a second row on a key 1220, and second terminals 27 of a third row at another side of the key 1220. The second terminals 25 includes two differential pairs which are composed of two second signal terminals 25S and three grounding terminals 25G.

The second terminals 25 include pairs of signal terminals and grounding terminals. The second terminals 27 transmit power current, that are power terminals. In detail, the second grounding terminal 25G includes a first horizon portion 250 extending rearwards from the contacting portion, a second horizontal portion 251 and an L-shaped portion 252. The first horizontal portions 250 are equal to the contacting portions, the L-shaped portion 252 is greater than the second horizontal portion 251, the second horizontal portion 251 are greater than the first horizontal portions 250 in width in the longitudinal direction. The second horizontal portions 251 or the L-shaped portion 252 are formed by widening two sides or one side of the first horizontal portion 250. The L-shaped portion 252 defines two holes 258 different in size. The middle portion 23 of the second signal terminals 25S includes a horizontal portion 254 extending from the contacting portion and an L-shaped portion 255. The L-shaped portions 255 of the two second signal terminals 25S shift towards each other for placement of the second horizontal portion 251 of the second grounding contact 25G.

Referring to FIG. 11, the second terminals 25 are insert-molded with a second insulator 42 to form a second contact module 2500 which is inserted into the base 10.

Figure 6:
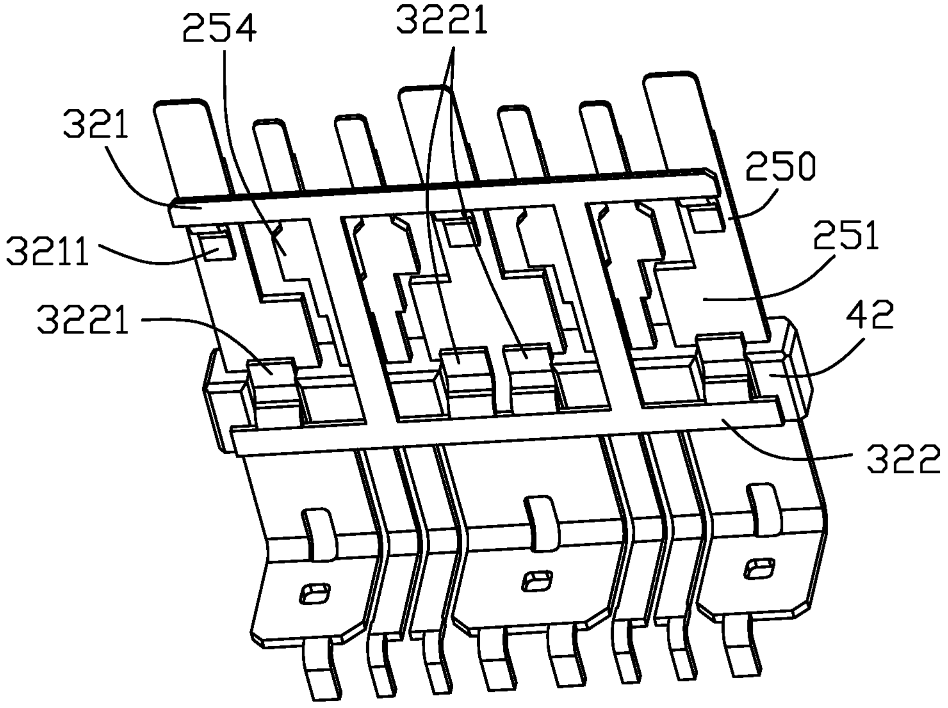
FIG. 6 is a perspective view of a second grounding member and a second group of terminals of FIG. 4.

Referring to FIGS. 4 and 6, the fifth finger 3211 terminals the first horizontal portion 250, the sixth finger 3221 terminals a rear end of the second horizontal portion 251. In detail, two sixth fingers 3221 contact the middle second grounding terminals 25G.

Figure 3:
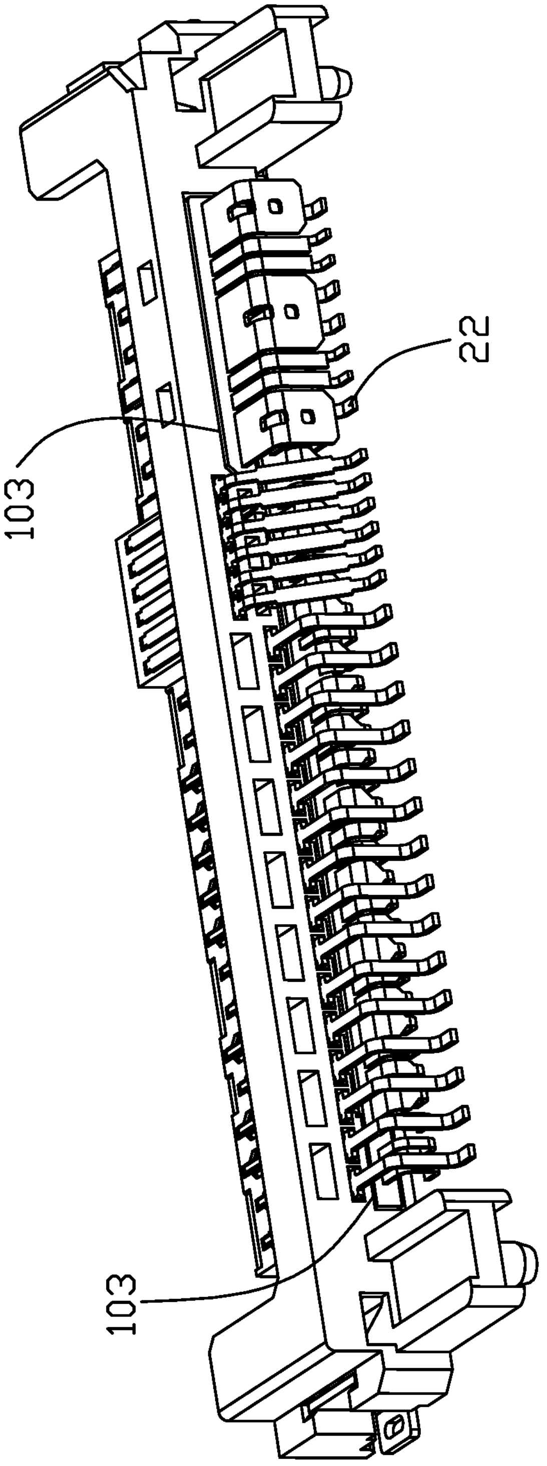
FIG. 3 is another perspective view of the electrical connector of FIG. 1.

Referring to FIGS. 3 and 10, the base 10 forms two openings 103 to allow the first contact module 2400 and the second contact module 2500 and the first grounding member 31 and the second grounding member 32 to extend therethrough for installing into a frame 101. In detail, the first grounding member 31 and the second grounding member 32 are located between the first contact module 2400 and the second contact module 2500, and the second grounding member 32 is located on a top of the first grounding member 31. The grounding member 31, 32 create a loop with the grounding terminals 24G and 25G via assistance of the fingers 3130, 3120, 3110, 3111, 3211 and 3221.

Although the present invention has been described with reference to particular embodiments, it is not to be construed as being limited thereto. Various alterations and modifications can be made to the embodiments without in any way departing from the scope or spirit of the present invention as defined in the appended claims.

The invention claimed is:

1. An electrical connector comprising:

a longitudinal housing defining a longitudinal direction and a front-rear direction perpendicular to the longitudinal direction;

a plurality of first terminals disposed in the housing and arranged in a row, the first terminals comprising a plurality of signal terminals and grounding terminals; and a first grounding member retained in the housing and comprising a plurality of first fingers and a plurality of second fingers; wherein the first fingers extend in the longitudinal direction, the second fingers extend in the front-rear direction, and each grounding terminal is mechanically and electrically connected with a corresponding first finger and a corresponding second finger; and the grounding member comprises a front bar, a rear bar, and a plurality of bridges united with the front bar and the rear bar in the front-rear direction, and the first fingers extend from corresponding bridges in the longitudinal direction.

2. The electrical connector as claimed in claim 1, wherein the grounding member comprises a plurality of third fingers and a plurality of fourth fingers extending in opposite front-rear directions.

3. The electrical connector as claimed in claim 2, wherein each second finger is partially overlapped with a corresponding third finger and a corresponding fourth finger in the front-rear direction, and the first fingers are located between the second fingers and the third fingers.

4. The electrical connector as claimed in claim 3, wherein the housing comprises a base and a tongue forwardly extending from the base, the first terminals are exposed upon a first surface of the tongue, the second fingers are located in the base, and the third fingers and the fourth are located in the tongue.

5. The electrical connector as claimed in claim 4, wherein the first fingers are located in the tongue and adjacent to the base.

6. The electrical connector as claimed in claim 4, further comprising a plurality of second terminals exposed upon a second surface of the tongue and a second grounding member, wherein the second terminals comprise a plurality of second signal terminals and second grounding terminals, and the second grounding member is mechanically and electrically connecting with the second grounding terminals.

7. The electrical connector as claimed in claim 6, wherein the first terminals are insert-molded with a first insulator, and the second terminals are insert-molded with a second insulator, the first insulator and second insulator are inserted into the base, and the first grounding member and the second grounding member are at least partially clamped between the first bar and second bar.

8. The electrical connector as claimed in claim 2, wherein the first fingers extend forwards from the rear bar, and the third and fourth fingers extend from the front bar.

9. An electrical connector comprising:

a longitudinal housing; and a plurality of first terminals disposed in the housing and arranged in a longitudinal direction, the plurality of first terminals comprising two first grounding terminals and a pair of first signal terminals between the two first grounding terminals, each of the first terminals comprising a contacting portion, a leg portion, and a middle portion joining the contacting portion and the leg portion; wherein the middle portion of the first terminal comprises a horizontal portion, an L-shaped portion, and a neck portion joining the horizontal portion and the L-shaped portion;

of the first grounding terminals, the horizontal portions and the L-shaped portion are wider than the contacting portions, and the neck portions are narrower than the horizontal portions and the L-shaped portion in the longitudinal direction; and of the first signal terminals, the horizontal portions are narrower than the contacting portions, and the horizontal portions shift toward each other in the longitudinal direction.

10. The electrical connector as claimed in claim 9, further comprising a plurality of second terminals disposed in the housing, wherein:

the second terminals comprise three second grounding terminals and two pairs of second signal terminals, the second terminal comprises a contacting portion, a leg portion, and a middle portion joining with the contacting portion and the leg portion, and the middle portion of the second terminal comprises a first horizontal portion, a second horizontal portion, and an L-shaped portion; and of the second grounding terminals, the first horizontal portions extend from the contacting portions and are equal in width to the contacting portions in the longitudinal direction, and each of the second horizontal portions and the L-shaped portions is wider than the contacting portion in the longitudinal direction.

11. The electrical connector as claimed in claim 10, wherein:

of the second signal terminals, the first horizontal portions are wider than the contacting portions, the second horizontal portions and the L-shaped portions of the pair of signal terminals shift towards each other and are narrower than the contacting portions in the longitudinal direction.

12. The electrical connector as claimed in claim 11, wherein each of the second horizontal portion and the L-shaped portion of a middle one of the three second grounding terminals is wider than that of each of the other two second grounding terminals.

13. An electrical connector comprising:

an insulative housing;

a plurality of first terminals disposed in the housing and comprising a plurality of first signal terminals and a plurality of first grounding terminals arranged in a first direction;

a first grounding member retained in the insulative housing and having a first finger and an associated second finger in touch with a corresponding first grounding terminal;

a plurality of second terminals disposed in the insulative housing and comprising a plurality of second signal terminals and a plurality of second grounding terminals; and a second grounding member retained in the insulative housing; wherein the first finger extends in the first direction and the second finger extends in a mating direction of the electrical connector.

14. The electrical connector as claimed in claim 13, wherein the first grounding member comprises plural first fingers and plural associated second fingers in touch with corresponding first grounding terminals, respectively.

* * * * *